(12) United States Patent
Baker et al.

(10) Patent No.: US 8,316,701 B2
(45) Date of Patent: Nov. 27, 2012

(54) AERODYNAMIC TESTING METHOD AND APPARATUS

(75) Inventors: Wink M. Baker, Fort Worth, TX (US); Mark R. Melanson, Aledo, TX (US); Ming Chang, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 253 days.

(21) Appl. No.: 12/950,250

(22) Filed: Nov. 19, 2010

(65) Prior Publication Data

US 2012/0125091 A1    May 24, 2012

(51) Int. Cl.
*G01M 9/00* (2006.01)
(52) U.S. Cl. .......................................... 73/147
(58) Field of Classification Search ........................ None
See application file for complete search history.

(56) References Cited

U.S. PATENT DOCUMENTS

| | | | | |
|---|---|---|---|---|
| 4,526,031 A | * | 7/1985 | Weisend et al. | 73/147 |
| 5,020,364 A | * | 6/1991 | Manitt et al. | 73/147 |
| 5,186,046 A | * | 2/1993 | Gouterman et al. | 73/147 |
| 5,341,676 A | * | 8/1994 | Gouterman et al. | 73/147 |
| 6,962,076 B2 | * | 11/2005 | Page et al. | 73/147 |
| 6,997,049 B2 | * | 2/2006 | Lacey, Jr. | 73/147 |
| 7,028,542 B2 | * | 4/2006 | Metni | 73/147 |
| 7,997,130 B1 | * | 8/2011 | Stonner et al. | 73/147 |

FOREIGN PATENT DOCUMENTS

| | | |
|---|---|---|
| JP | 8166318 A | 12/1994 |
| JP | 2000131186 A | 10/1998 |
| JP | 2003035628 A | 7/2001 |

OTHER PUBLICATIONS

History: Original Design. Whirling Arm (original). Spiraling Arm (improvements).
Higuchi et al., Flow Over a Magnetically Suspended Cylinder in an Axial Free Stream. American Institute of Aeronautics and Astronautics, AIAA-2005-1078, pp. 1-10.
Melanson et al., Wind Tunnel Testing's Future: A Vision of the Next Generation of Wind Tunnel Test Requirements and Facilities. American Institute of Aeronautics and Astronautics, 2009, pp. 1-14.
Ulrich et al., System Identification and Control of Mechanical Samara Micro-Air-Vehicles. American Institute of Aeronautics and Astronautics, pp. 1-14.
Robins, The First Wind Tunnels, U.S. Centennial of Flight Commission, pp. 1-3.
Magnetic Suspension and Balance System Supply Result, Mitsubishi Heavy Industries, Ltd., pp. 1 and 2.

* cited by examiner

*Primary Examiner* — Lisa Caputo
*Assistant Examiner* — Jermaine Jenkins
(74) *Attorney, Agent, or Firm* — Reising Ethington P.C.; John J. Snyder

(57) ABSTRACT

An aerodynamic testing apparatus includes a test object carrier that carries a test object along an orbital test path through a fluid test medium. The apparatus may be configured to carry a test object along a generally spiraling orbital test path through the fluid test medium.

36 Claims, 2 Drawing Sheets

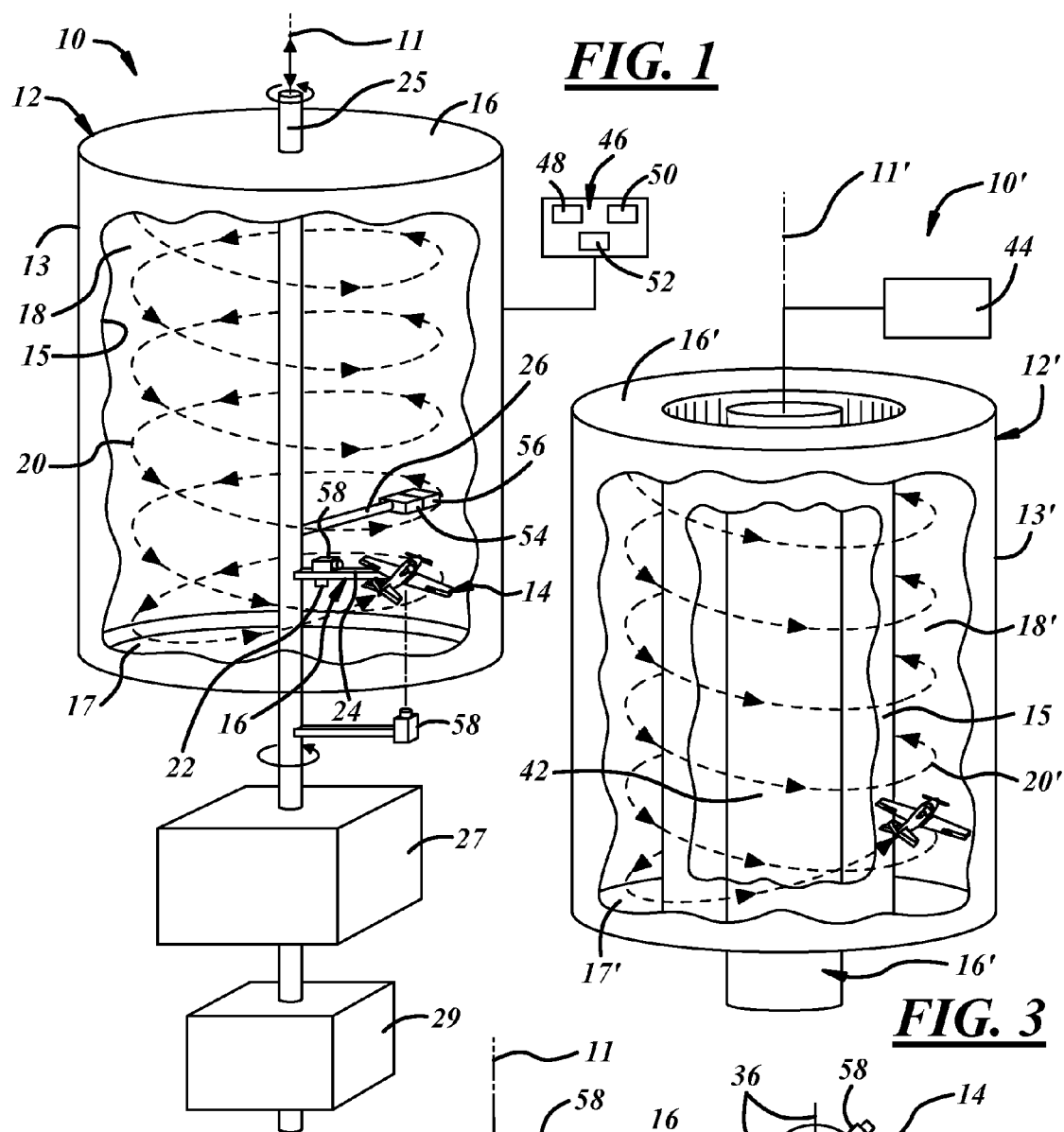
*FIG. 1*
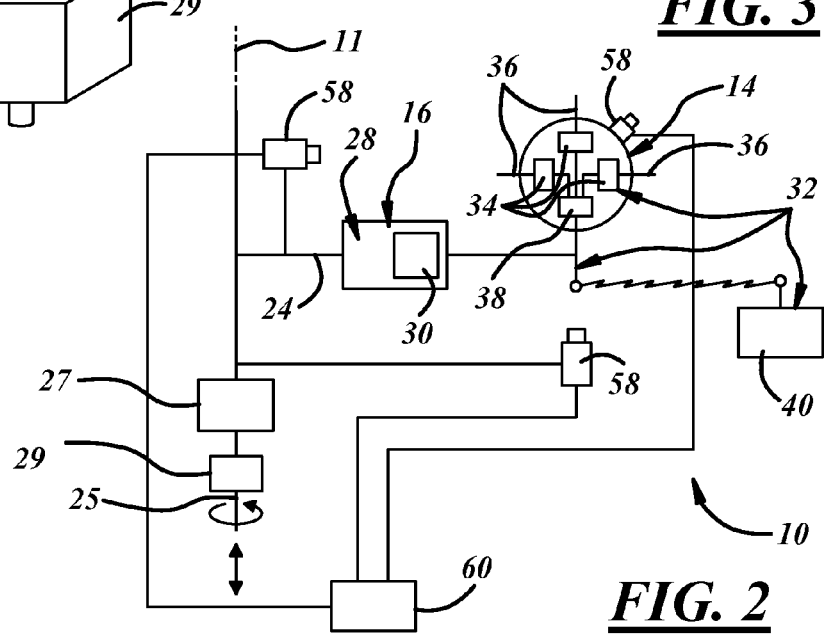
*FIG. 3*
*FIG. 2*

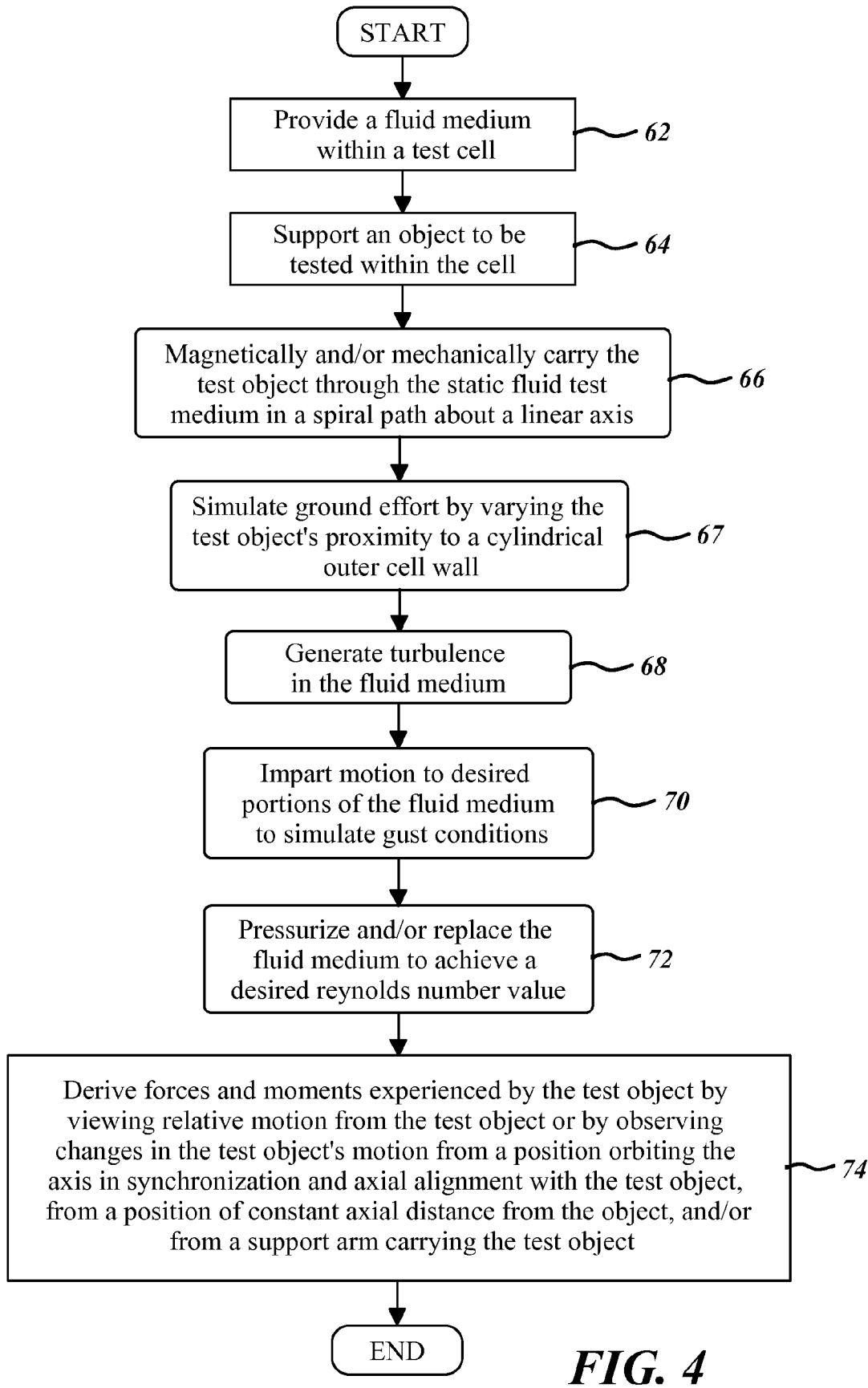

AERODYNAMIC TESTING METHOD AND APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to the testing of aerodynamic effects on a relatively small test object such as a nano or micro-sized air vehicle or a model of such a vehicle.

DESCRIPTION OF THE RELATED ART INCLUDING INFORMATION DISCLOSED UNDER 37 CFR 1.97 AND 1.98

It's known for aerodynamic effects on a relatively small test object to be tested using a test system including a whirling support arm that carries the test object through an ambient air mass. Such whirling support arms are known to comprise a wire or rod adapted to support a test object at a radially outer distal end. It's also known for such test systems to include drive arrangements including either weights or a drive motor that causes the support arm to carry the test object around a circular orbital path.

In axial-flow wind tunnels it's known to remotely control the pitch and yaw of test objects using a model support interface. It's also known for test objects to be supported in axial-flow wind tunnels using magnetic levitation.

BRIEF SUMMARY OF THE DISCLOSURE

An aerodynamic testing apparatus is provided for testing aerodynamic effects on a test object such as a micro or nano-sized air vehicle or a model of such a vehicle. The apparatus includes a test object carrier configured to carry a test object along a generally spiraling orbital test path through a fluid test medium. The generally spiraling orbital test path prevents the test object from encountering its own wake turbulence.

A test cell may surround the spiraling orbital test path of a test object to be carried through the medium. The test cell may also be closed, enclosing the fluid test medium and the test path. The test cell may include a generally cylindrical outer wall and may also include a generally cylindrical inner wall disposed coaxially within and spaced radially from the cylindrical outer wall.

The test object carrier may be configured to impart axis rotations to the test object and/or to vary the test object's proximity to the cylindrical outer wall. A dynamic stability measurement device may be connected to the test object carrier and configured to measure dynamic stability derivatives in response to forces generated when the test object carrier imparts axis rotations to the test object.

The test object carrier may be configured to accomplish performance evaluations through dynamic system identifications.

The test object carrier may include a support arm connected to and extending radially outward from a drive shaft. The test object carrier may be configured to support a test object adjacent a radially outer distal end of the arm. The test object carrier may also or alternatively include an articulated model support interface carried by the support arm and configured to allow for changes in test object attitude.

The articulated model support interface may include a multi-axis motor control support system configured to adjust test object attitude in response to control inputs.

The test object carrier may include a remote control device configured to adjust test object attitude by operating test object flight control servos in response to control input. Such a remote control device may include a receiver carried by the test object and connected to the test object flight control servos and may further include a transmitter configured to transmit electromagnetic signals to the flight control servos via the receiver to allow for remote control of test object flight control servos.

The test object carrier may include a magnetic suspension balance system configured to magnetically support and move an air vehicle model along the test path. The apparatus may include a force measurement device connected to the magnetic suspension balance system and configured to measure aerodynamic forces exerted on or by the test object by monitoring, measuring, and processing signals received from the magnetic suspension balance system.

The apparatus may include an external effects device configured to impart desired test conditions to the test object.

A camera may be positioned and oriented to view test object motion images and a processor may be connected to the camera and configured to calculate test object forces or moments in response to signals received from the camera and representing test object motion. Such a camera may be positioned outside the test cell with at least a portion of a wall of the test cell disposed between the camera and the test object being configured to transmit at least a portion of the frequency spectrum of electromagnetic energy sensed by the camera.

Also, a method is provided for testing aerodynamic effects on a test object. According to this method, one can test aerodynamic effects on a test object by carrying a test object through a fluid test medium along a generally spiraling orbital test path.

Further according to the method, test object forces or moments may be derived by analyzing test object motion, and non-static fluid medium conditions may be simulated by imparting motion to at least a portion of the fluid test medium. Turbulence may be simulated by generating turbulence in the test medium, and/or gust conditions may be simulated by moving at least a portion of the test medium in a desired direction relative to the test path.

Further according to the method, the step of carrying a test object through a fluid test medium may include carrying the test object through a generally static fluid test medium, carrying the test object along a generally spiraling orbital test path that is defined about a generally linear orbital axis, the use of magnetism to support and carry the test object along the test path, and/or the provision of a test cell comprising a cylindrical outer wall at least partially enclosing the fluid test medium.

Further according to the method, ground effects may be simulated by varying a test object's proximity to the cylindrical outer wall of the test cell.

The step of deriving test object forces or moments may include providing a test cell that at least partially encloses the test medium, and then viewing the test object from a position outside the cell, from a direction parallel to a generally linear orbital axis about which the path of the test object is defined, from a position orbiting the axis in synchronization and axial alignment with the test object, and/or from a position of constant axial distance from the test object. The relative motion of the test object may be viewed from a fixed position relative to the test object, from the test object itself, and/or from a support arm provided to carry the test object along the test path.

Further according to the method, Reynolds number effects may be simulated by pressurizing the test cell and/or by using different fluid test mediums.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 1 is a schematic isometric view of an aerodynamic testing apparatus constructed according to one embodiment the invention;

FIG. 2 is a schematic diagram showing the aerodynamic testing apparatus of FIG. 1;

FIG. 3 is a schematic isometric view of an aerodynamic testing apparatus constructed according to an alternative embodiment of the invention; and FIG. 4 is a flow chart showing an aerodynamic testing method.

DETAILED DESCRIPTION OF INVENTION EMBODIMENT(S)

An aerodynamic testing apparatus for testing aerodynamic effects on a test object is generally shown at 10 in FIGS. 1 and 2. A second embodiment is generally shown at 10' in FIG. 3. Reference numerals with the designation prime (') in FIG. 3 indicate alternative configurations of elements that also appear in the first embodiment. Unless indicated otherwise, portions of the following description that use a reference numeral to refer to FIG. 1 or 2 apply equally to elements designated by primed numerals in FIG. 3.

As shown in FIGS. 1 and 3, the apparatus may include a test object carrier 16 configured to carry a test object 14 through a fluid test medium 18 such as a still, non-turbulent air mass, to evaluate aerodynamic performance parameters of an air vehicle having the same or similar shape as the test object 14. The test object 14 may either be of the same size as or may be scaled down from the size of an air vehicle whose aerodynamic performance parameters are to be tested. The apparatus may be configured to direct a test object 14 along a generally spiraling orbital test path 20 about a generally vertical axis 11 through the fluid test medium 18 as shown in FIG. 1.

The apparatus may include a test cell 12 that surrounds the spiraling orbital test path 20 of a test object 14 to be carried through the fluid test medium 18. The test cell 12 may be partially or fully closed, partially or completely enclosing the fluid test medium 18 and the test path 20. As shown in FIG. 1 the test cell 12 may have the general shape of a hollow cylinder, including a generally cylindrical outer wall 13 and axially opposite circular top and bottom end caps 16, 17 that cooperate with the outer wall 13 to enclose the fluid test medium 18 within a generally cylindrical test cell volume.

As shown in FIG. 3, the test cell 12' may alternatively have the general shape of a hollow rectangular toroid, i.e., a toroid of rectangular cross section, including a generally cylindrical inner wall 15 disposed coaxially within and spaced radially from the cylindrical outer wall 13'. The end caps 16', 17' may be annular in shape and may cooperate with the inner and outer walls 15, 13' to enclose the fluid test medium 18 within a generally rectangular toroidal test cell volume, i.e. a volume defined by a toroid of rectangular cross-section.

The test object carrier 16 may be configured to impart axis rotations to the test object 14, i.e., to rotate the test object 14 about its pitch, yaw, and/or roll axes. For example, the object carrier 16 may be configured to rotate a test object 14 about the object's pitch axis to impart pitch plunge motions to the test object 14. The test object carrier 16 may also be configured to vary the proximity of the test object to the cylindrical outer wall 13 to allow for simulation of ground effects. A dynamic stability measurement device 22 may be connected to the test object carrier 16 and configured to measure dynamic stability derivatives in response to forces generated when the test object carrier 16 imparts axis rotations to the test object 14.

The test object carrer 16 may be configured to accomplish performance evaluations through dynamic system parameter identifications (PID), i.e., by building dynamic models from test object performance data using mathematical tools and algorithms. PIDs may be accomplished by evaluating data obtained from the testing apparatus 10 using any one of a number of different PID methods known in the art, such as the frequency response-based PID method disclosed in the paper entitled System Identification and Control of Mechanical Samara Micro Air Vehicles presented by Evan R. Ulrich, J. Sean Humbert, and Darryll J. Pines to the American Institute of Aeronautics and Astronautics (the AIAA paper), which paper is incorporated herein by reference in its entirety. However, unlike the PID method disclosed in the AIAA paper, which uses eight cameras in a sophisticated camera tracking system, as is described in detail below, a more simple camera tracking system may be used in which camera tracking is tied to the same apparatus that drives the test object 14. As is also described below, a two-camera system may be used to obtain stereo imagery and better depth perception. According to this approach, image (and data) quality is improved because the entire image can be used, increasing spatial resolution. Also unlike the PID method disclosed in the AIAA paper, which derives test object 14 attitude via a sophisticated camera tracking system, as is further described in the preceding paragraph and in the paragraphs below, where the test object carrier 16 includes a number of motor control systems that are used to control test object 14 attitude, one can detect test object attitude information via signals received from those motor control systems.

The test object carrier 16 may include a support arm 24 connected to and extending radially outward from a generally vertical drive shaft 25, and may be configured to removably support a test object 14 adjacent a radially outer distal end of the arm 24. As shown in FIG. 1 the drive shaft 25 may be driven in rotation by a motor 27 and driven axially by a linear actuator 29 or other suitable mechanism.

As shown in FIG. 2 the test object carrier 16 may include an articulated model support interface 28 carried by the support arm 24 and configured to allow for changes in test object attitude. The articulated model support interface 28 may include a multi-axis motor control support system 30 configured to adjust test object attitude in response to control inputs.

As best shown in FIG. 2 the test object carrier 16 may include a remote control device 32 configured to adjust test object attitude by operating test object flight control servos 34 to change positions of test object flight controls 36 in response to control inputs. The remote control device 32 may include a receiver/controller 38 carried by the test object 14 and connected to the test object flight control servos 34 and may also include a transmitter 40 configured to transmit electromagnetic signals to the flight control servos 34 via the receiver/ controller 38 to allow for remote control of the test object flight controls 36. In other words, the test object flight controls 36 may be controlled via RC technology.

According to the alternative embodiment shown in FIG. 3, the test object carrier 16' may include a magnetic suspension balance system 42 configured to magnetically support and move a test object 14' along the test path 20'. A force measurement device 44 may be connected to the magnetic suspension balance system 42 and may be configured to measure aerodynamic forces exerted on or by the test object 14'. The force measurement device 44 may be configured to measure such aerodynamic forces by monitoring, measuring, and processing signals received from the magnetic suspension balance system 42. Other known types of non-intrusive or minimally intrusive support may alternatively be used to support and carry the test object 14' along a desired test path 20' through the test medium 18'. The use of such non-intrusive or minimally intrusive support systems further enhances test accuracy by minimizing support system interference with fluid dynamics and freedom of motion.

As shown in FIG. 1, the apparatus may include an effects device 46 configured to impart desired test conditions to the test object 14. The effects device 46 may include, for example, a turbulence generator 48 configured to impart turbulence to the fluid test medium 18, a gust generator 50 configured to generate gust conditions in the fluid test medium 18, and/or an airburst generator 52 configured to generate an airburst condition in the fluid test medium 18. As is also shown in FIG. 1, effects may also or alternatively be generated from a leading arm 26 extending radially from the drive shaft 25 in an upwind position from the test object 14 and carrying turbulence generating objects 54 such as rods or screens, and/or a sound generator 56 configured to impart sound waves to the fluid test medium 18.

One or more cameras 58 may be positioned and oriented to sense and record aircraft motion. As shown in FIGS. 1 and 2, one or more cameras 58 may be disposed in one or more positions remote from the test object 14 to record images of test object motion. In addition or alternatively, at least one of the cameras 58 may be disposed on or carried by the test object 14 to sense test object motion by sensing and recording relative motion of other objects or surfaces from the vantage point of the test object 14. As shown in FIG. 2, a processor 60 may be connected to each camera 58 and configured to calculate test object forces or moments in response to signals that are received from each camera describing test object motion. The processor 60 may, for example, comprise a computer configured to use system identification techniques to analyze digital images and calculate test object forces or moments.

One camera 58 may be positioned outside the test cell 12, and at least a portion of a wall of the test cell 12 may be disposed between the camera and the test object 14 as shown in FIG. 1. The portion of the wall disposed between the camera and the test object 14 may comprise a material capable of transmitting at least a portion of the frequency spectrum of electromagnetic energy that the camera is capable of sensing. For example, the camera 58 may be a visual light sensing camera and an axial end wall 17 of the test cell 12, or a portion of the axial end wall 17 may be transparent to visual light or may include a window portion comprising a material transparent to visual light.

In practice, aerodynamic effects on a test object 14 can be tested by first providing a generally static fluid medium 18 within a test cell 12 as shown in action step 62 of FIG. 4 and, as shown in action step 64 of FIG. 4, supporting the test object 14 within the test cell 12. As shown in action step 66 of FIG. 4, the test object 14 may then be either magnetically or mechanically carried through the generally static fluid test medium 18 along a generally spiraling orbital test path 20 that may be defined about a generally linear orbital axis 11. As shown in optional action step 67, ground effects may be simulated by varying the test object's proximity to a cylindrical outer wall 13 of the test cell 12. Non-static fluid medium conditions may be simulated by generating turbulence in the test medium 18 at one or more points or regions along the test path 20 as shown in optional action step 68. As shown in optional action step 70, gust conditions may be simulated by moving at least a portion of the test medium 18 in a desired direction relative to one or more points or regions along the test path 20. As shown in optional action step 72 a test object's Reynolds number may be altered by pressurizing the contents of the test cell 12 and/or by using different fluid test mediums.

As shown in action step 74 of FIG. 4, test object forces or moments may be derived by observing changes in the test object's motion. Motion of the test object 14 may be viewed from a position either inside or outside the test cell 12 and/or from a direction parallel to a generally linear orbital axis about which the path of the test object 14 is defined, Motion of the test object 14 may be viewed from a position orbiting the axis 11 in synchronization and axial alignment with the test object 14, and/or from a position of constant axial distance from the test object. Relative motion of the test object 14 may optionally be viewed from a fixed position relative to the test object 14, e.g., from the test object itself, and/or from a support arm 24 provided to carry the test object 14 along the test path.

Such an apparatus allows for more accurate testing of objects such as micro and nano-sized air vehicles, or models of such vehicles, whose relatively small size, low Reynolds number, and low speed don't lend themselves to accurate aerodynamic characteristics evaluation via conventional means, i.e., through the use of conventional axial-flow wind tunnel test cells.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An aerodynamic testing apparatus for testing aerodynamic effects on a test object, the apparatus comprising a test object carrier configured to carry a test object along a spiraling orbital test path through a fluid test medium.

2. An aerodynamic testing apparatus as defined in claim 1 and further including a test cell configured to surround the spiraling orbital test path of a test object to be carried through the medium.

3. An aerodynamic testing apparatus as defined in claim 2 in which the test cell is closed, enclosing the fluid test medium and the test path.

4. An aerodynamic testing apparatus as defined in claim 2 in which the test cell includes a generally cylindrical outer wall.

5. An aerodynamic testing apparatus as defined in claim 4 in which the test object carrier is configured to vary the test object's proximity to the cylindrical outer wall.

6. An aerodynamic testing apparatus as defined in claim 2 in which the test cell includes a generally cylindrical inner wall disposed coaxially within and spaced radially from the cylindrical outer wall.

7. An aerodynamic testing apparatus as defined in claim 1 in which the test object carrier is configured to impart axis rotations to the test object.

8. An aerodynamic testing apparatus as defined in claim 7 in which a dynamic stability measurement device is connected to the test object carrier and configured to measure dynamic stability derivatives in response to forces generated when the test object carrier imparts axis rotations to the test object.

9. An aerodynamic testing apparatus as defined in claim 1 in which the test object carrier is configured to accomplish performance evaluations through dynamic system identifications.

10. An aerodynamic testing apparatus as defined in claim 1 in which the test object carrier includes a support arm connected to and extending radially outward from a drive shaft and configured to support a test object adjacent a radially outer distal end of the arm.

11. An aerodynamic testing apparatus as defined in claim 10 in which the test object carrier includes an articulated model support interface carried by the support arm and configured to allow for changes in test object attitude.

12. An aerodynamic testing apparatus as defined in claim 11 in which the articulated model support interface includes a multi-axis motor control support system configured to adjust test object attitude in response to control inputs.

13. An aerodynamic testing apparatus as defined in claim 1 in which the test object carrier includes a remote control device configured to adjust test object attitude by operating test object flight control servos in response to control input.

14. An aerodynamic testing apparatus as defined in claim 13 in which the remote control device includes a receiver carried by the test object and connected to the test object flight control servos and further includes a transmitter configured to transmit electromagnetic signals to the flight control servos via the receiver.

15. An aerodynamic testing apparatus as defined in claim 1 in which the test object carrier includes a magnetic suspension balance system configured to magnetically support and move an air vehicle model along the test path.

16. An aerodynamic testing apparatus as defined in claim 15 in which the apparatus includes a force measurement device connected to the magnetic suspension balance system and configured to measure aerodynamic forces exerted on or by the test object by monitoring, measuring, and processing signals received from the magnetic suspension balance system.

17. An aerodynamic testing apparatus as defined in claim 1 in which the apparatus includes an external effects device configured to impart desired test conditions to the test object.

18. An aerodynamic testing apparatus as defined in claim 1 in which a camera positioned and oriented to view test object motion images and a processor connected to the camera and configured to calculate test object forces or moments in response to signals received from the camera and representing test object motion.

19. An aerodynamic testing apparatus as defined in claim 1 in which the apparatus includes:
    a test cell surrounding the orbital test path of a test object to be carried through the medium;
    a camera positioned outside the test cell; and
    at least a portion of a wall of the test cell is disposed between the camera and the test object and is configured to transmit at least a portion of the frequency spectrum of electromagnetic radiation sensed by the camera.

20. A method for testing aerodynamic effects on a test object by carrying a test object through a fluid test medium along a generally spiraling orbital test path.

21. The method of claim 20 including the additional step of deriving test object forces or moments by analyzing test object motion.

22. The method of claim 21 including the additional step of simulating non-static fluid medium conditions by imparting motion to at least a portion of the fluid test medium.

23. The method of claim 21 in which the step of deriving test object forces or moments includes at least partially enclosing the test medium in a test cell and viewing the test object from a position outside the cell.

24. The method of claim 23 in which the step of deriving test object forces or moments includes viewing the test object from a direction parallel to a generally linear orbital axis about which the path of the test object is defined.

25. The method of claim 23 in which the step of deriving test object forces or moments includes viewing the test object from a position orbiting the axis in synchronization and axial alignment with the test object.

26. The method of claim 23 in which the step of deriving test object forces or moments includes viewing test object motion from a position of constant axial distance from the test object.

27. The method of claim 23 in which the step of deriving test object forces or moments includes viewing relative motion from the test object.

28. The method of claim 23 in which the step of deriving test object forces or moments includes viewing the relative motion of one or more images from the test object from a support arm provided to carry the test object along the test path.

29. The method of claim 22 in which the step of simulating non-static fluid medium conditions includes simulating turbulence by generating turbulence in the test medium.

30. The method of claim 22 in which the step of simulating non-static fluid medium conditions includes simulating gust conditions by moving at least a portion of the test medium in a desired direction relative to the test path.

31. The method of claim 20 in which the step of carrying a test object through a fluid test medium includes carrying the test object through a generally static fluid test medium.

32. The method of claim 20 in which the step of carrying a test object through a fluid test medium includes carrying the test object along a generally spiraling orbital test path that is defined about a generally linear orbital axis.

33. The method of claim 20 in which magnetism is used to support and carry the test object along the test path.

34. The method of claim 20 in which the step of carrying a test object through a fluid test medium includes:
    at least partially enclosing the fluid test medium in a test cell comprising a cylindrical outer wall; and
    simulating ground effects by varying the test object's proximity to the cylindrical outer wall of the test cell.

35. The method of claim 20 including the additional step of simulating Reynolds number effects by pressurizing the test cell.

36. The method of claim 20 including the additional step of simulating Reynolds number effects by using different fluid test mediums.

* * * * *